United States Patent
Phelan et al.

(10) Patent No.: US 7,008,345 B2
(45) Date of Patent: Mar. 7, 2006

(54) PLANETARY DIFFERENTIAL

(75) Inventors: Perry E. Phelan, deceased, late of Harsens Island, MI (US); by Marj Phelan, legal representative, Harsens Island, MI (US); Gerald S. Szczepanski, Dearborn, MI (US); Richard M. Krzesicki, Ann Arbor, MI (US); Norman Szalony, Brighton, MI (US); James M. Story, Saline, MI (US); Bhulabai S. Narayanan, Novi, MI (US)

(73) Assignee: Automotive Components Holdings Inc., Dearborn, MI (US)

( * ) Notice: Subject to any disclaimer, the term of this patent is extended or adjusted under 35 U.S.C. 154(b) by 29 days.

(21) Appl. No.: 10/694,249

(22) Filed: Oct. 27, 2003

(65) Prior Publication Data

US 2005/0090358 A1   Apr. 28, 2005

(51) Int. Cl.
*F16H 48/20* (2006.01)

(52) U.S. Cl. .................. 475/231; 475/248; 475/249; 74/606 R; 74/607

(58) Field of Classification Search ............ 475/231, 475/248, 249; 74/606 R, 607; 192/110 R, 192/109 B, 70.16, 70.2
See application file for complete search history.

(56) References Cited

U.S. PATENT DOCUMENTS

| | | | |
|---|---|---|---|
| 3,343,429 A | | 9/1967 | Frost |
| 4,781,078 A | | 11/1988 | Blessing et al. |
| 5,024,364 A | | 6/1991 | Nash |
| 5,024,634 A | * | 6/1991 | Blessing ................ 475/86 |
| RE33,742 E | * | 11/1991 | Blessing et al. .......... 475/150 |
| 5,080,640 A | | 1/1992 | Botterill |
| 5,156,578 A | | 10/1992 | Hirota |
| 5,162,026 A | | 11/1992 | Krisher |
| 5,176,590 A | | 1/1993 | Haydock |
| 5,209,707 A | | 5/1993 | Teraoka |
| 5,217,416 A | | 6/1993 | Dick |
| 5,282,775 A | | 2/1994 | Teraoka |
| 5,322,484 A | | 6/1994 | Reuter |
| 5,326,333 A | * | 7/1994 | Niizawa et al. .......... 475/249 |
| 5,415,598 A | * | 5/1995 | Sawase et al. ............ 475/86 |
| 5,464,084 A | | 11/1995 | Aoki et al. |
| 5,484,348 A | | 1/1996 | Brown et al. |
| 5,527,229 A | | 6/1996 | Ishihara et al. |
| 5,533,423 A | | 7/1996 | Stehle et al. |
| 6,045,479 A | | 4/2000 | Victoria et al. |
| 6,371,880 B1 | | 4/2002 | Kam |

FOREIGN PATENT DOCUMENTS

| | | | |
|---|---|---|---|
| JP | 04107347 A | * | 4/1992 |
| JP | 04312248 A | * | 11/1992 |

* cited by examiner

*Primary Examiner*—Charles A. Marmoh
*Assistant Examiner*—David D. Le

(57) ABSTRACT

A planetary differential including a differential case rotatable about an axis and a method of manufacturing thereof. The differential case includes a cover, a housing, an annulus gear, and a ring gear. The differential case defines a differential cavity having a clutch cavity and a planet cavity separated by a retainer plate coupled to the housing. The modular nature of this system allows both open and torque biasing constructions in the same packaging space. The method of manufacturing the differential includes the steps of coupling a retainer plate to the housing between the clutch cavity and the axial opening, placing a planetary gear set in the planetary cavity, and fixing the housing to the annulus gear and ring gear.

6 Claims, 5 Drawing Sheets

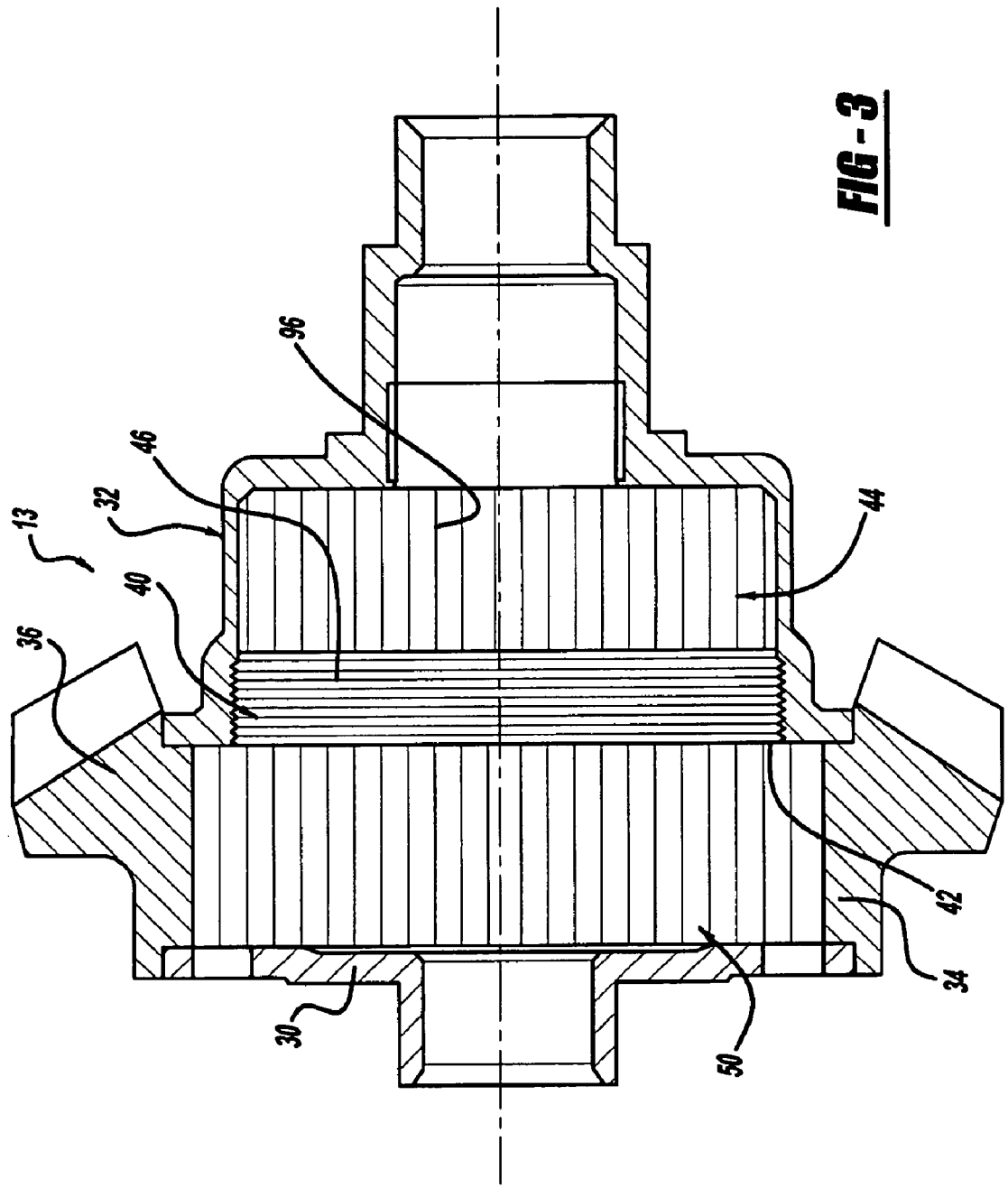

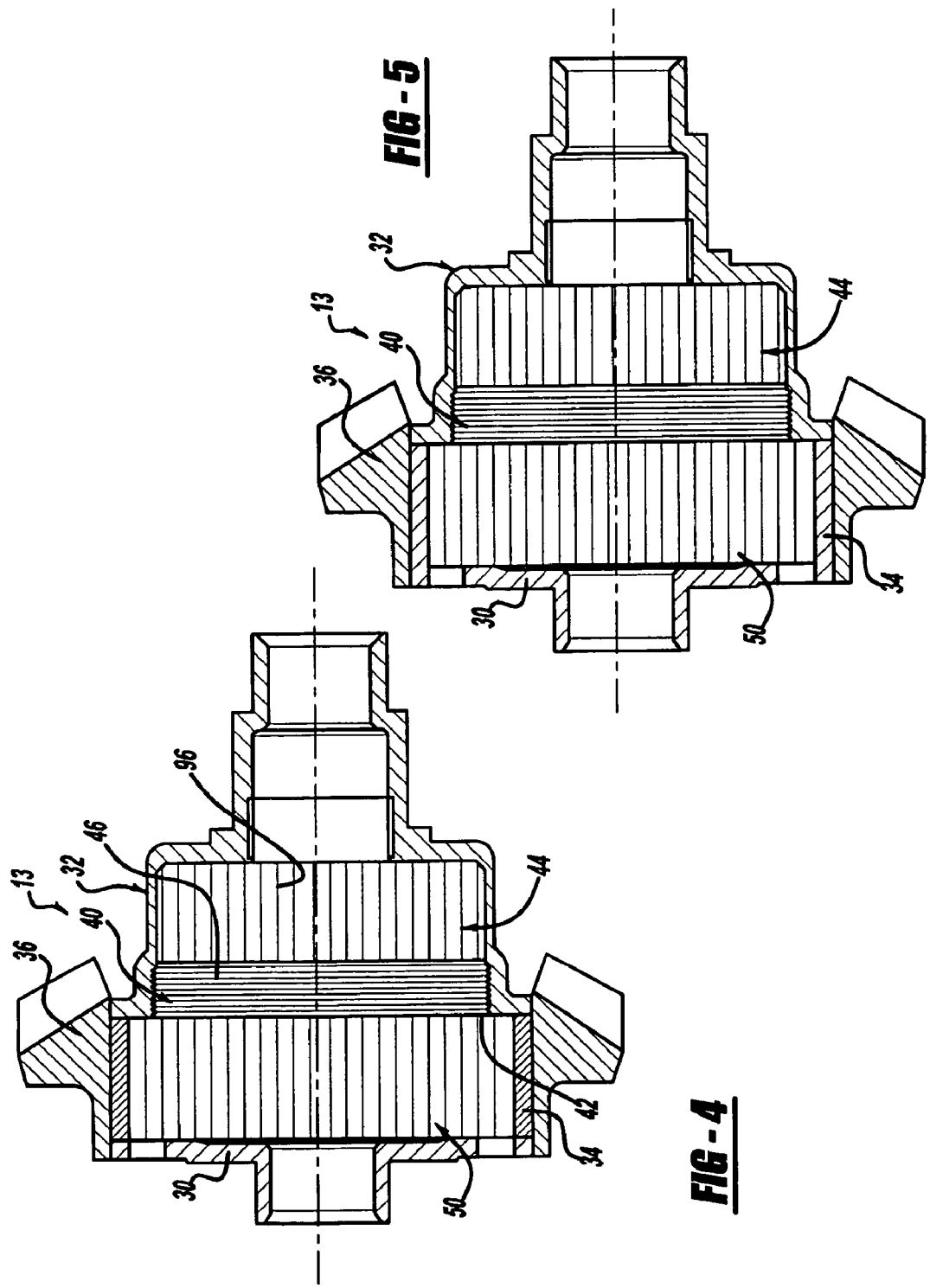

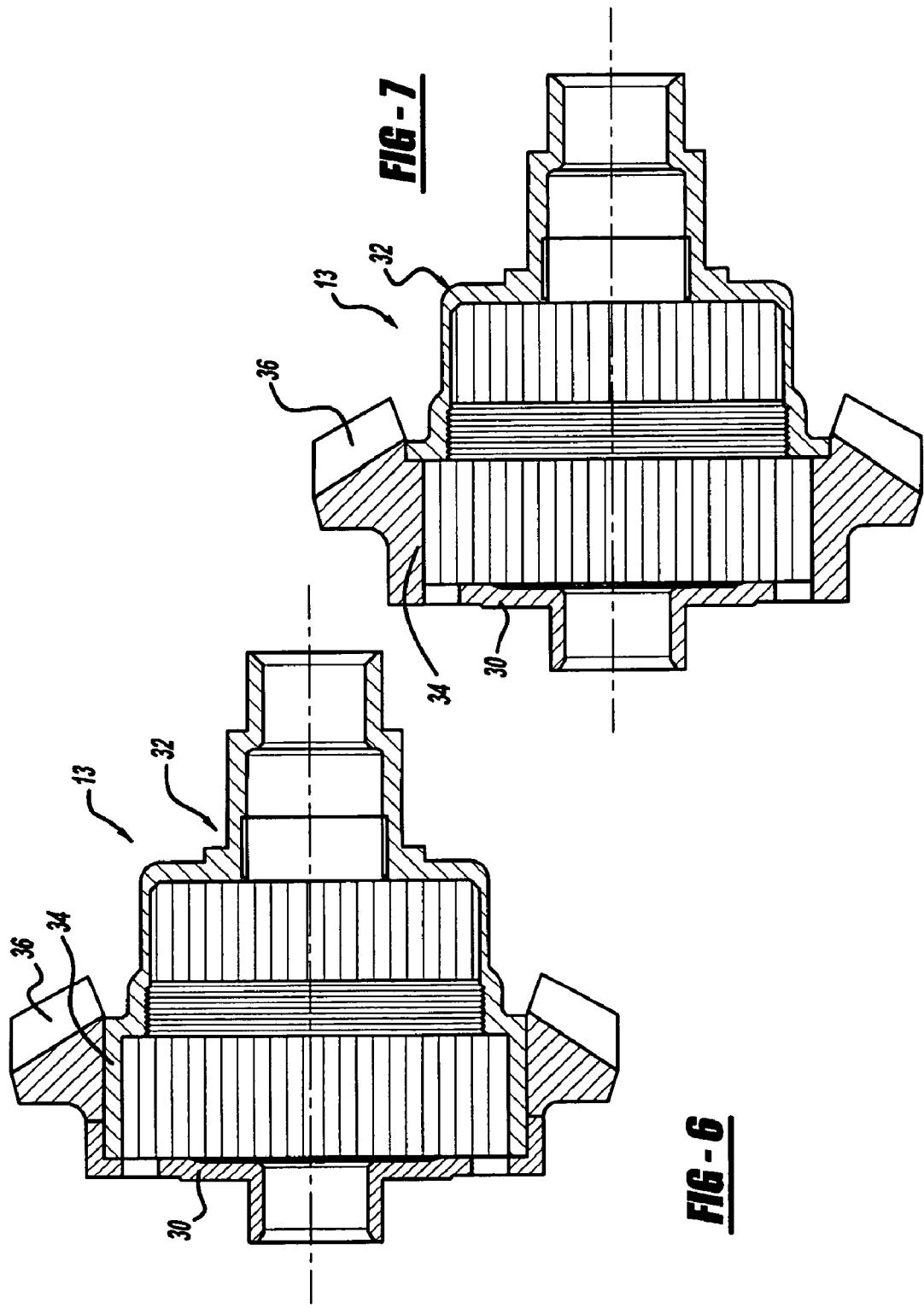

PLANETARY DIFFERENTIAL

BACKGROUND OF THE INVENTION

The present invention is generally directed to a planetary differential and, more particularly, to a planetary differential that is readily configured as either a torque biasing or an open differential. An additional feature of the planetary differential is a defined torque transfer path that excludes the differential case housing and/or cover so as to permit the use of a lighter weight planetary differential and a greater variety of manufacturing techniques.

Numerous types and configurations of differentials are used in the drivelines of vehicles for transferring torque between rotatable elements such as shafts. These types include an axle differential wherein a drive shaft rotates a hypoid or spiral bevel pinion gear, which rotates a like ring gear fixed to a case that houses differential gears coupled to drive either an output axle or half-shafts. Axle differentials may be of the torque biasing or open type. In torque biasing axle differentials, the amount of torque transferred to each axle or half-shaft is controllable by a torque biasing mechanism such as a clutch. In open differentials, the axle or half-shafts are free to rotate relative to one another. Torque biasing differentials are commonly used to counter slip of a driven wheel as well as in torque steering and other applications.

Commonly available differentials have various differential case configurations and non-interchangeable operative components depending on whether the differential is a torque biasing or an open type. As a result, if the vehicle manufacturer desires to provide torque biasing and open differential options for a single vehicle platform, the vehicle frame and other components are commonly modified to accommodate the specific differential configuration.

Further, in conventional designs, the differential case is in the torque transfer path between the external ring gear and the differential gearing, e.g., planetary or pinion differential. As a result, the differential case is subjected to torque loading during operation. This differential case loading requires a robust differential case that negatively impacts the overall weight of the differential and limits the processes and material that may be used during manufacture.

SUMMARY OF THE INVENTION

The planetary differential of the present invention addresses the above and other deficiencies in the art. The planetary differential includes a differential case rotatable about an axis. The differential case includes a cover, a housing, an annulus gear, and a ring gear. The differential case defines a differential cavity having a clutch cavity and a planetary cavity. The planetary differential further includes a retainer plate coupled to the housing to separate the clutch and planetary cavities.

The present invention is further directed to a method of manufacturing a planetary differential having a differential case with a cover and a housing, an annulus gear, and a ring gear. The differential case again has a clutch cavity and axial opening defined by the housing and a planetary cavity. The method includes the steps of coupling a retainer plate to the housing between the clutch cavity and the axial opening, placing a planetary gear set in the planetary cavity, and fastening the housing to either the annulus gear or the ring gear.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

FIG. 3 is a sectional view of the differential case shown in FIGS. 1 and 2;

FIG. 4 is a sectional view of a second embodiment of the differential case;

FIG. 5 is a sectional view of a third embodiment of the differential case;

FIG. 6 is a sectional view of a fourth embodiment of the differential case; and

FIG. 7 is a sectional view of a fifth embodiment of the differential case.

DETAILED DESCRIPTION OF THE PREFERRED EMBODIMENT

Figure 1:
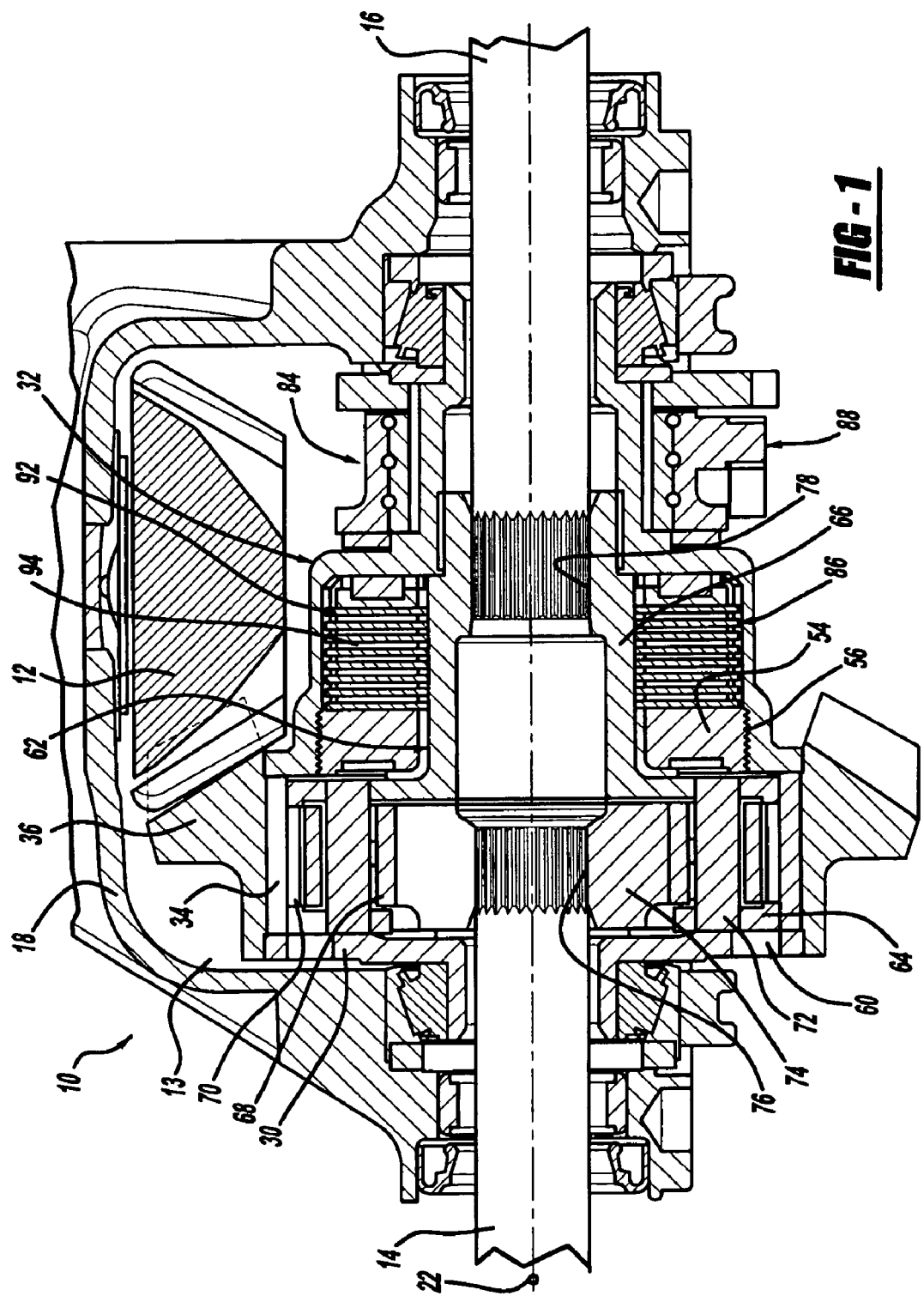
FIG. 1 is a sectional view of the differential according to the present invention configured to function as a torque biasing planetary differential.

The present invention is generally directed to a planetary differential 10 for communicating torque from a rotary drive, such as the illustrated hypoid or spiral bevel pinion gear 12, to first and second output half-shafts 14 and 16. The differential 10 includes a stationary enclosure 18 supported by the vehicle frame in a conventional manner. The first and second output shafts 14 and 16 are supported for rotation about an axis 22 within the stationary enclosure 18. The differential 10 further includes a differential case 13 generally disposed within the enclosure 18 for rotation about the axis 22.

The differential case 13 is shown to include a cover 30, a housing 32, an annulus gear 34, and a ring gear 36 meshed with the like pinion gear 12 to rotatably drive the differential case 13. By this configuration, the differential case 13 generally forms a differential cavity 40 (FIG. 3). The housing 32 includes an axial opening 42, a clutch cavity 44 within the differential cavity 40 and a threaded segment 46 between the axial opening 42 and clutch cavity 44. The differential cavity 40 also includes a planetary cavity 50 that accommodates a planetary gear set as hereinafter described. A retainer plate 54 (FIGS. 1 and 2) includes threads 56 configured to engage the threaded segment 46 and couple the retainer plate to the housing between the clutch cavity 44 and planetary cavity 50. The threaded engagement between the retainer plate 54 and housing 32 permits adjustment of the axial position relative to the clutch cavity 44. The retainer plate 54 resists axial forces from the planetary gear set, particularly the planetary carrier, such that the planetary differential 10 may be selectively configured to function as a torque biasing differential or an open differential as described in greater detail below.

The aforementioned planetary gear set, indicated by reference numeral 60 (FIGS. 1 and 2), includes a planetary carrier 62 having a pedestaled flange 64 and an axial hub 66, inner and outer planetary gears 68 and 70, respectively, which are coupled to rotate with and relative to the planetary carrier 62 via planet shafts 72. The planetary gear set 60 further includes a sun gear 74 having an internally splined bore 76 that receives a cooperatively splined end on the first output shaft 14 to rotationally couple the first output shaft to the sun gear. Similarly, the planetary carrier 62 includes an internally splined bore 78 to rotationally drive the second output shaft 16. As with conventional planetary differentials, the outer planet gears 70 are meshed with the annulus gear 34 and the inner planet gear 68. The inner planet gears 68 are in turn meshed with the sun gear 74. For completeness, it is noted that the annulus gear 34 preferably has twice the number of teeth as the sun gear 74 to ensure that the rotational velocity of the sun gear and planetary carrier 62 at the axle shafts is equal but opposite when the associated vehicle traverses a curve.

Figure 2:
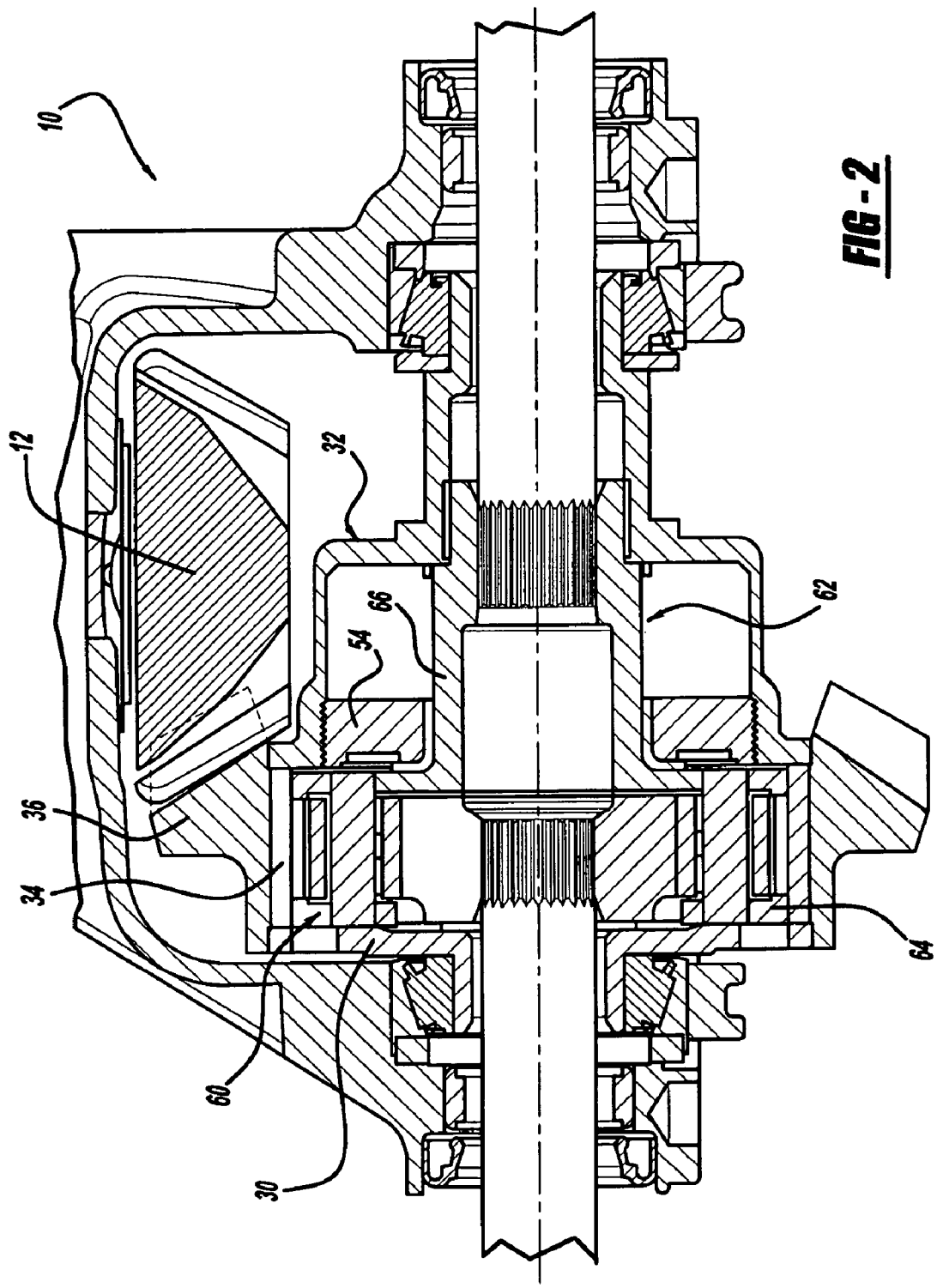
FIG. 2 is a sectional view of the differential according to the present invention configured to function as an open planetary differential.

The planetary differential 10 is further illustrated in FIG. 1 to include a torque biasing assembly 84 including a clutch pack 86 and a clutch actuator 88. As noted above, the planetary differential 10 may be configured to function as either a torque biasing differential or an open differential. In the latter case, the clutch pack 86 and clutch actuator 88 are omitted as shown in FIG. 2. Where torque biasing is desired, the clutch pack 86 and actuator 88 are included as shown in FIG. 1.

To facilitate these dual applications, the differential housing 32 may include suitable assembly holes to accommodate actuating pistons passing between the clutch pack 86 and actuator 88 in a manner generally known in the art. For completeness, it is noted that the torque biasing assembly will generally also include suitable bearings. Further, while a variety of clutch packs and actuators generally known in the art may be suitable for the planetary differential of the present invention, the illustrated embodiment of the clutch pack 86 includes interleaved first and second clutch plates 92 and 94, respectively, and an actively controllable actuator capable of biasing torque between the first and second output shafts without a predetermined magnitude of differential movement between the planetary carrier 62 and housing 32. In the illustrated embodiment, the first clutch plates 92 rotate with the housing 32 and the second clutch plates 94 rotate with the planetary carrier hub 66. To facilitate the rotational coupling between these elements, the hub 66 and housing 32 may be provided with external and internal splines, such as the splines 96 shown in FIG. 3. The retainer plate 54, in addition to being axially adjustable to accommodate tolerance variations in the clutch pack and planetary carrier, also functions as a reactor plate for the clutch pack when the planetary differential is configured to function as a torque biasing differential.

In addition to the configuration described above facilitating the modularity of the planetary differential, that is, its ready conversion from or to a torque biasing differential or an open differential, the configuration of the differential case 13 facilitates assembly of the differential and reduces the necessary robustness and associated costs of the cover 30 and housing 32. Robustness and cost benefits are achieved in part by removing the cover 30 and housing 32 from the torque path thereby increasing manufacturing options.

FIGS. 3–7 illustrate alternative configurations of the differential case 13, each designed to provide modularity, assembly, and/or manufacturing benefits. More particularly, as noted above, the differential case 13 generally includes the cover 30, housing 32, annulus gear 34, and hypoid or spiral bevel ring gear 36. While the ring gear 36 is illustrated in the attached drawings and specifically referred to herein as a hypoid or spiral bevel gear, the invention may be used with other ring gear configurations including helical or spur gears. As shown in FIGS. 3–7, each of these components may be manufactured separately (FIG. 4) or certain components may be integrally formed or consolidated with one another (FIGS. 3 and 5–7). The configuration of each of these embodiments and preferred assembly sequences for the planetary differential 10 will now be described with reference to the respective figures. Notwithstanding the illustrative examples provided below, those skilled in the art will appreciate that modifications to the assembly sequences and the specific embodiments may be made without departing from the spirit and scope of the invention.

As shown in FIG. 4, each of the cover 30, housing 32, annulus gear 34, and hypoid or spiral bevel ring gear 36 may be formed separately such that, when assembled, the case 13 defines the differential cavity 40 with the clutch cavity 44 and planetary cavity 50. The annulus gear 34 is rigidly connected to the torque transferring ring gear 36. As a result, the cover 30 and housing 32 are removed from the torque transfer path to reduce the load requirements and cost of these components as well as permit use of alternative manufacturing techniques, such as orbital forging/forming and flow forming. Similar manufacturing and cost benefits are realized from the embodiments shown in FIGS. 3 and 5–7 as discussed below. With respect to the embodiment shown in FIG. 3, torque is transmitted from the hypoid or spiral bevel pinion gear 12 (FIG. 1) to the mating like ring gear 36, to the annulus gear 34, and then to the planetary gear set 60 and first and second output shafts 14 and 16. By this configuration, the cover 30 and housing 32 are not required to accommodate significant torque loads. Rather, the cover and housing support the internal components of the differential, enhance lubrication, support the torque biasing actuator, and resist the axial and separating loads imparted by the gearing as well as any biasing torque and axial load imparted by the biasing device.

The configuration of the differential case 13 also facilitates assembly of the planetary differential 10. With respect to the four-piece differential case embodiment illustrated in FIG. 4, assembly of the planetary differential 10 includes the steps of laser welding the cover 30 to the annulus gear 34 to define an annulus/cover assembly and disposing the planetary gear set 60 within the planetary cavity 50. The clutch pack (if a torque biasing differential is desired) may be disposed within the clutch cavity 44 defined by the housing 32 and the retainer plate 54 is secured to the housing. The assembled housing is then aligned with and laser welded to the annulus/cover assembly. The resulting housing/annulus/cover assembly is aligned, press fit and laser welded to the hypoid or spiral bevel ring gear. Those skilled in the art will appreciate that while a preferred assembly process has been described with regard to the embodiment shown in FIG. 4, other processes may be used. For example, the sequence of the welding of the hypoid or spiral bevel ring gear to the annulus gear may occur at any time during assembly. Further, while the components of the differential case are preferably laser welded to one another in order to facilitate assembly, other welding or fastening techniques (such as friction welding, splined couplings, or press fit engagements) may be used to rotationally couple the components.

The three-piece differential case embodiment shown in FIGS. 1 and 2 is also illustrated in FIG. 3. In this embodiment, the annulus gear 34 is integral with the hypoid or spiral bevel ring gear 36 to form an annulus/ring gear assembly. The housing 32 is welded to the annulus/ring gear assembly to form a housing/annulus/ring gear assembly and, if desired, the clutch pack is disposed in the clutch cavity 44.

The planetary gear set 60 is then disposed in the planet cavity 50 and the cover 30 is aligned, press fit, and welded to the ring gear/housing assembly. This embodiment again isolates the cover 30 and housing 32 from the torque transfer path.

In the three-piece differential case embodiment illustrated in FIG. 5, the cover 30 is formed integral with the annulus gear 34 to form a cover/annulus assembly that further defines the planetary cavity 50. The planetary gear set 60 is then disposed in the planetary cavity and, if desired, the clutch pack is disposed in the clutch cavity 44 of the housing 32. The components are then aligned and press fit together whereupon the cover/annulus assembly and housing 32 are welded to the hypoid or spiral bevel ring gear 36. In this embodiment, the cover 30, being integral with the annulus gear 34, may be subjected to torque transfer loading. However, the housing 32 is again isolated from the torque transfer path.

In the three-piece planetary differential embodiment illustrated in FIG. 6, the housing 32 is formed integral with the annulus gear 34 to form a housing/annulus assembly which is welded to the hypoid or spiral bevel ring gear 36. The internal components, including the planetary gear set 60 and torque biasing assembly 84 (if desired), are assembled and the cover 30 and housing/annulus assembly are welded to the hypoid or spiral bevel ring gear 36. In this embodiment, the housing 32, being integral with the annulus gear 34, may be subjected to torque transfer loading. However, the cover 30 is again isolated from the torque transfer path.

In the two-piece differential embodiment illustrated in FIG. 7, the cover 30 is formed integral with the annulus gear 34 and the hypoid or spiral bevel ring gear 36 to form a cover/annulus/gear assembly. The components of the planetary gear set 60 and, if desired, torque biasing assembly 84, are then disposed in the appropriate cavities and the housing 32 is welded to the cover/annulus/gear assembly. In this embodiment, the cover 30, being integral with the annulus gear 34 and ring gear 36, may be subjected to torque transfer loading. However, the housing 32 is again isolated from the torque transfer path.

As generally indicated above, the configuration of the differential case 13 provides numerous operational, assembly, and manufacturing advantages over prior art differentials. Conventionally, differential cases are cast iron components with thick sections to compensate for porosity. Casting precision is limited by numerous factors, including material flow and mold shift, and differential cases commonly require extensive machining. The planetary differential 10 of the present invention provides a torque transfer path that minimizes the load requirements of selected components of the differential case 13, e.g., cover 30 and housing 32, and permits the use of more efficient and precise manufacturing processes such as flow and orbital forming. In these processes only a small region of the component is plastically deformed at any instant thereby allowing the forces applied by the forming tool to be localized, resulting in thinner and lighter sections, sharper radii and tighter tolerances compared to conventional casting or forging processes. Further, flow forming allows variable wall thicknesses to be produced and more effectively places material where it is needed for strength and stiffness. Other sheet shaping processes, such as stamping, generally do not provide the desired thickness variation. Orbital forming reduces forming loads compared to conventional forging, which may be limited by press load capacity, provides greater manufacturing precision, and reduces machining for certain defined components of the differential case such as internal and external teeth, splines and lugs. In addition, removal of the cover 30 and/or housing 32 from the torque transfer path as described above permits the use of cold formable materials (such as low carbon steel), again reducing manufacturing costs in workpiece, tooling and, with the elimination of high temperatures, processing as compared to conventional hot forging.

The covers 30 shown in FIGS. 3, 4, and 6 and the consolidated cover/annulus gear 30/34 in FIG. 5 are excellent applications of the flow forming process. The planetary carrier 62 shown in FIGS. 1, 2, and 3 can be produced cost effectively by combining the orbital process to produce a preform with a subsequent flow forming processes to sharpen detail. This is also true for the housing 32 shown in FIGS. 3, 4, 5 and 7, and the consolidated housing/annulus gear 32/34 shown in FIG. 6. Orbital forming is well suited to the production of the consolidated cover/annulus gear/ring gear 30/34/36 shown in FIG. 7.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A planetary differential comprising:
    a differential case rotatable about an axis, said differential case including a cover, a housing, an annulus gear, and a ring gear, said differential case defining a differential cavity having a clutch cavity and a planet cavity, and wherein said housing includes a threaded segment;
    a planetary carrier including a pedestaled flange and an axial hub, and wherein said clutch cavity is bounded by a retainer plate, said axial hub, and said housing;
    said retainer plate coupled to said housing and separating said clutch cavity from said planet cavity and wherein said housing has said threaded segment, wherein the retainer plate has threads engaging said threaded segment to permit adjustment of the axial position of said retainer plate relative to said housing.

2. The planetary differential of claim 1 wherein said housing includes an axial opening, said retainer plate coupled to said housing between said clutch cavity and said axial opening.

3. The planetary differential of claim 2 wherein said cover is fastened to said annulus gear to form said planet cavity, said ring gear is fastened to said annulus gear, and said housing is fastened to said ring gear or said annulus gear.

4. The planetary differential of claim 2 wherein said ring gear is integral with said annulus fear, said cover is fastened to said integral annulus/ring gear and said housing is fastened to said integral annulus/ring gear.

5. The planetary differential of claim 1 wherein said retainer plate is coupled to said housing to resist axial forces from said planetary carrier such that said planetary differential is selectively configurable to function as a torque biasing differential or an open differential.

6. The planetary differential of claim 5 further including a planetary gear set disposed within said planet cavity, said planetary gear set including said planetary carrier, inner and outer planet gears, and a sun gear, wherein said inner and outer planet gears are coupled to rotate with and relative to said planetary carrier, wherein said outer planet gears are meshed with said annulus gear, wherein said inner planet gears are meshed with said outer planet gears and said sun gear and wherein said planetary differential includes a clutch pack disposed in said clutch cavity and a clutch actuator operatively coupled to said clutch pack when said planetary differential is configured to function as a torque biasing differential, said clutch pack including first clutch plates fixed to rotate with said housing and second clutch plates fixed to rotate with said planetary carrier, and wherein said retainer plate operatively engages said clutch pack to function as a reactor plate for said clutch pack when said planetary differential is configured to function as a torque biasing differential.

* * * * *